United States Patent [19]

Ikeda et al.

[11] Patent Number: 4,933,700
[45] Date of Patent: Jun. 12, 1990

[54] AUTOMATIC FOCUSING APPARATUS OF CAMERA

[75] Inventors: Kei Ikeda, Yokohama; Tsutomu Narisawa, Ohmiya; Yasuaki Ishiguro, Fujimi; Masao Owashi, Kawasaki, all of Japan

[73] Assignee: Nikon Corporation, Tokyo, Japan

[21] Appl. No.: 384,820

[22] Filed: Jul. 25, 1989

[30] Foreign Application Priority Data

Jul. 27, 1988 [JP] Japan .................................. 63-187748
Sep. 12, 1988 [JP] Japan .................................. 63-229674
Nov. 15, 1988 [JP] Japan .................................. 63-289695

[51] Int. Cl.$^5$ .............................................. G03B 3/00
[52] U.S. Cl. .................................... 354/400; 354/402; 354/412
[58] Field of Search ............................ 354/400–409, 354/412

[56] References Cited

U.S. PATENT DOCUMENTS 4,734,727 3/1988 Takemae ............................ 354/412
4,788,603 11/1988 Fujimura et al. .................... 354/412
4,827,303 5/1989 Tsuboi ................................ 354/403

FOREIGN PATENT DOCUMENTS 63-17417 1/1988 Japan .

Primary Examiner—L. T. Hix
Assistant Examiner—David M. Gray
Attorney, Agent, or Firm—Shapiro and Shapiro

[57] ABSTRACT

An automatic focusing apparatus of a camera includes a detecting unit, a lens driving unit, an instruction output unit, and a control unit. The detecting unit forms pieces of information concerning focus conditions of a photographic lens with respect to at least three areas in a field. The lens driving unit drives the photographic lens in order to perform focusing. The instruction output unit outputs an instruction for changing the position of the photographic lens. On the basis of the information from the detecting unit, the control unit controls the lens driving unit such that the photographic lens is focused on one of the areas in response to a release operation and the instruction and then sequentially focused on the remaining areas in accordance with a predetermined sequence.

12 Claims, 15 Drawing Sheets

AUTOMATIC FOCUSING APPARATUS OF CAMERA

BACKGROUND OF THE INVENTION

1. Field of the Invention

The present invention relates to an automatic focusing apparatus of a camera and, more particularly, to an automatic focusing apparatus of a camera, which can perform continuous photographing while changing a photographing distance with respect to objects to be photographed in a single picture on the basis of information concerning a distance to an object to be photographed detected by a focus detect device.

2. Related Background Art

In order to photograph an object to be photographed having a depth exceeding a depth of field corresponding to a depth of focus of a photographic lens, a conventional auto focus (to be referred to as "AF" hereinafter) camera includes a multi-distance measuring apparatus for measuring distances to objects to be photographed located in a plurality of areas in a field to obtain measured distance values for the respective objects to be photographed.

In a camera of this type, a focusing position of a lens is determined only once on the basis of a measured distance value corresponding to a closest object to be photographed or an average value of measured distance values corresponding to objects to be photographed in a plurality of areas, and the lens is driven to this focusing position to perform photographing.

In photographing, a user normally depresses a release button to the first stroke, confirms through a finder that a lens is focused on a desired object to be photographed, and then depresses the release button to the second stroke to perform photographing. If the user is a beginner not knowing such a way of confirmation, however, focusing on a desired object to be photographed may not be performed by one photographing operation as described above, and an undesired photograph may be taken. In addition, in photographing performed by remote control or using a self-timer, a user cannot check whether a lens is focused on a desired object to be photographed. In such photographing, therefore, an out-focus shot or photograph may be taken by one focusing operation as described above.

Japanese Patent Laid-Open No. 63-17417 discloses a conventional automatic focusing apparatus of this type.

In this apparatus, a plurality of focus detection areas are provided in a field, a focus condition of a lens with respect to an object to be photographed in each area is detected, and an object on which the lens is to be focused can be selected from the objects to be photographed in the respective areas upon operation of an operating member. By operating a release button after an operation of selecting a predetermined object to be photographed on which the lens is to be focused is performed, the lens is driven to a focus position for focusing the lens on the object to be photographed.

In the above conventional apparatus disclosed in Japanese Patent Laid-Open No. 63-17417, however, an object on which the lens is to be focused must be determined before photographing, i.e., before a depressing operation of the release button to the first stroke. Therefore, the following problem may be posed in photographing. That is, for example, assume that a user performs an operation for selecting a far object to be photographed on which the lens is to be focused and then performs a depressing operation to the first stroke while viewing the object to be photographed through a finder. In this case, if the user changes his or her mind by checking a composition obtained when the lens is focused on the far object to be photographed and determines to focus the lens on a close object to be photographed, he or she must re-operate the operating member after canceling the depressing operation to the first stroke and re-perform the depressing operation to the first stroke, resulting in poor operability.

Another conventional automatic focusing apparatus of a camera detects a focus condition of an object to be photographed in a field central area by a focus detect device, calculates a defocus amount to a focus position of a lens on the basis of a detection result of the focus condition, and drives the lens to the focus position in accordance with the calculated defocus amount.

In this camera with the above conventional automatic focusing apparatus, the lens is driven to perform photographing on the basis of only one defocus amount detected by the focus detect device. Under such control based on one defocus amount, however, if a main object to be photographed is much smaller than a picture or has a large depth, an object to be photographed desired by a user and that determined by the camera do not always coincide with each other. As a result, a photograph in focus with an object that the user intended may not sometimes be taken.

In addition, when a user is a beginner or photographing using a self-timer, a main object to be photographed often falls outside a focus detection area of a camera. Therefore, it is sometimes difficult to take a photograph reliably in focus with the main object to be photographed.

SUMMARY OF THE INVENTION

It is, therefore, an object of the present invention to eliminate the drawbacks of the above conventional apparatuses and to provide an automatic focusing apparatus of a camera, which can take a plurality of in-focus shots or photographs of an object to be photographed having a large distance difference in accordance with a distance to the object to be photographed and can be easily operated.

It is another object of the present invention to provide an automatic focusing apparatus of a camera, which can take at least one photograph in focus with a desired object to be photographed even if a user is a beginner or when a user performs photographing from a position apart from a camera as in photographing performed by remote control or using a self-timer.

It is still another object of the present invention to enable changing of a focus position of a lens while a release button is depressed to the first stroke in a camera capable of automatic focusing by performing a depressing operation of the release member to the first stroke.

In order to achieve the above objects, the present invention comprises a focus detecting means for detecting information concerning a focus condition based on a distance to an object to be photographed, a lens driving means for driving a lens on the basis of the information from the focus detecting means in order to perform focusing, a mode setting means capable of setting, on the basis of the information from the focus detecting means, a continuous photographing mode for performing photographing while sequentially displacing a lens to a plurality of focus positions with respect to an object to be photographed and a single photographing mode for performing one photographing operation, and a control means for controlling the lens driving means in accordance with the photographing mode set by the mode setting means.

According to embodiments of the present invention, the focus detecting means sets a plurality of focus detection areas in a field and detects a focus condition of a lens based on a distance to an object to be photographed located in each focus detection area. In the continuous photographing mode, focusing is performed on the basis of distance information detected for each focus detection area.

According to the present invention, a clear photograph in focus with a desired position can be taken for even an object to be photographed having a large depth. Therefore, a highly reliable automatic focusing apparatus of a camera can be obtained.

Other objects, features, and effects of the present invention will be fully apparent from the following description taken in connection with the accompanying drawings.

BRIEF DESCRIPTION OF THE DRAWINGS

FIGS. 13A and 13B are views for explaining a positional relationship between a camera and an object to be photographed, in which FIG. 13A shows a state wherein objects to be photographed in distance measuring zones are separated from each other, and FIG. 13B shows a state wherein a difference between photographing distances to objects to be photographed in two distance measuring zones is small while a difference between a photographing distance to an object to be photographed in another distance measurement zone and those to the objects to be photographed in the above two distance measuring zones is large;

DESCRIPTION OF THE PREFERRED EMBODIMENTS

Embodiments of the present invention will be described in detail below with reference to the accompanying drawings.

Figure 1:
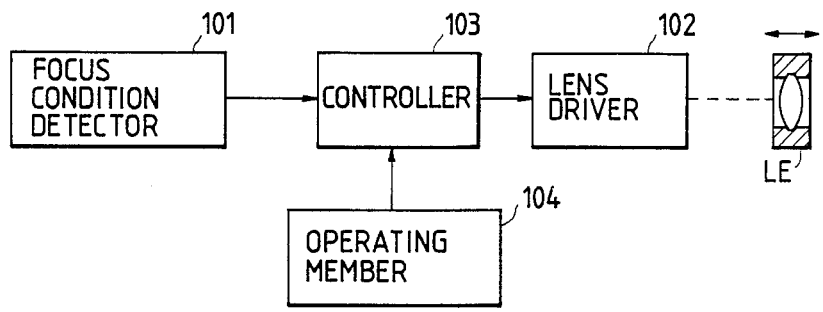
FIG. 1 is a block diagram showing a main part of a schematic arrangement according to a first embodiment of the present invention.
Figure 2:
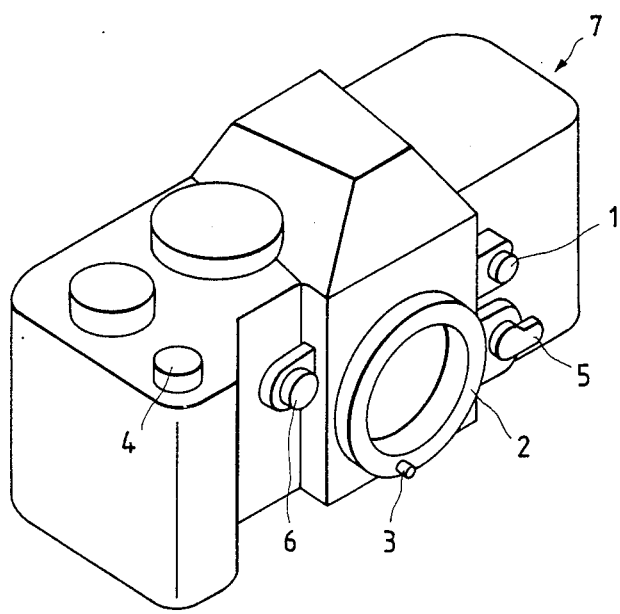
FIG. 2 is a perspective view showing a camera incorporating an apparatus of the first embodiment of the present invention.

FIG. 1 shows a main part of an arrangement according to a first embodiment of the present invention, and FIG. 2 shows a camera main body except for its exchangeable lens, in which an apparatus of the first embodiment is incorporated.

As shown in FIG. 1, an automatic focusing apparatus of a camera according to the first embodiment of the present invention comprises a focus condition detector 101 for detecting focus conditions of a photographic lens LE with respect to objects to be photographed in a plurality of focus detection areas provided in a field, a lens driver 102 for driving the lens LE along an optical axis in order to perform focusing, and a controller 103 for controlling the driver 102 to focus the lens LE on one of the objects to be photographed in the respective detection areas on the basis of the focus condition detected by the focus condition detector 101 upon depressing operation of a release button 4 shown in FIG. 2 to the first stroke. The automatic focusing apparatus also includes an operating member 104 operated to change a focus position of the lens LE.

The lens LE is detachably mounted on a lens mount 2 shown in FIG. 2 and can be detached upon operation of a mount lock button 1. The lens LE includes a coupling shaft rotated by a driving shaft 3 projecting on the mount 2 upon focusing and driven by rotation of the coupling shaft. A camera main body 7 comprises the release button 4, a focusing mode selector 5, and a focus lock 6.

In the camera according to the first embodiment, a manual focusing mode (to be referred to as an "M-F mode" hereinafter), a S-AF mode (to be referred to as an "S-AF mode" hereinafter), and a C-AF mode (to be referred to as a "C-AF mode" hereinafter) can be set as a focusing mode. In the M-F mode, a focusing ring of the lens LE, for example, is manually operated to drive the lens to a desired focusing position. In the S-AF mode, the lens LE is focused on an object to be photographed upon depressing operation of the release button 4 to the first stroke and fixed at the position after it is focused. In the C-AF mode, the lens is repeatedly focused on a desired object to be photographed while the release button 4 is depressed to the first stroke. One of these focusing modes is selected in accordance with a position of the focusing mode selector 5 and set in a control circuit 16 to be described later.

Figure 3:
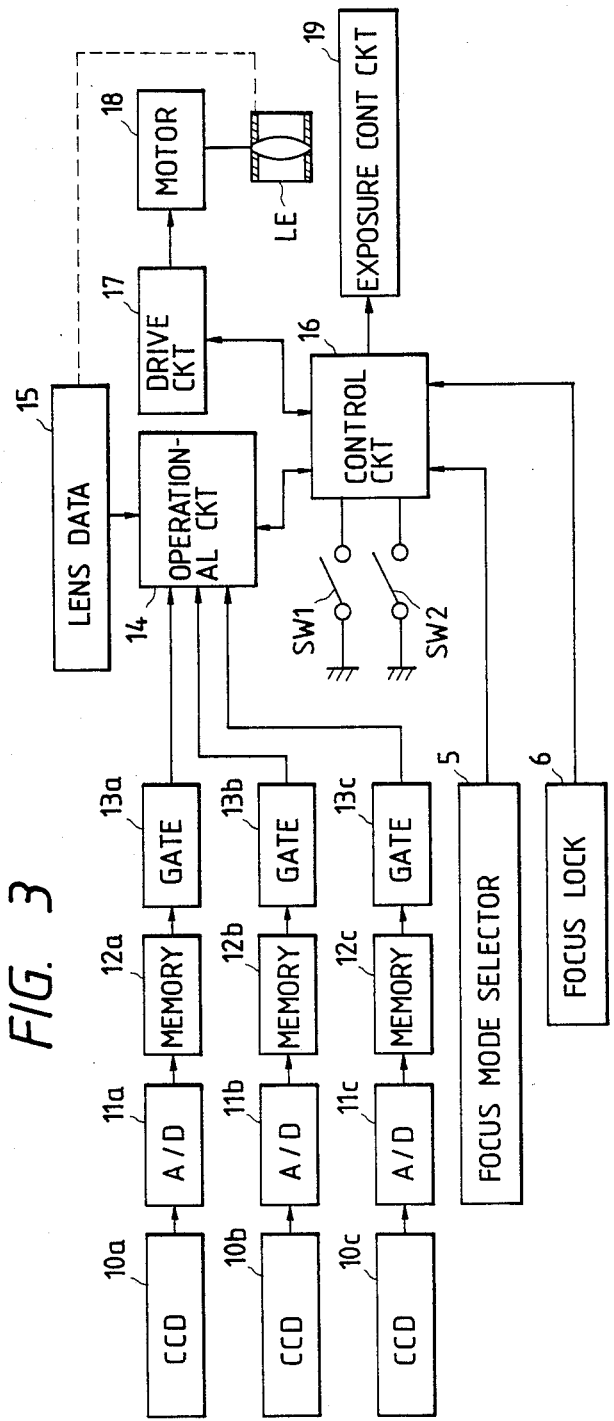
FIG. 3 is a block diagram showing an overall arrangement of the apparatus according to the first embodiment incorporated in the camera shown in FIG. 2.

FIG. 3 is a block diagram showing a control system.

Figure 4:
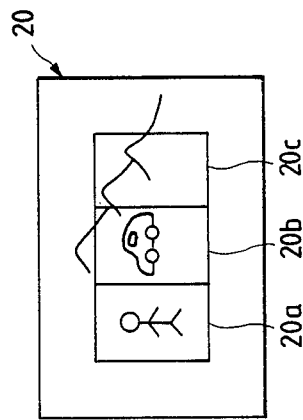
FIG. 4 is a plan view for explaining focus detection areas in a field according to the first embodiment.

Referring to FIG. 3, sensors 10a, 10b, and 10c are CCD line sensors arranged at a position substantially equivalent to a film surface and correspond to focus detection areas 20a, 20b, and 20c in a field 20 shown in FIG. 4, respectively. That is, images of objects to be photographed in the focus detection areas 20a, 20b, and 20c guided in the camera main body 7 through the lens LE are imaged on detection surfaces of the sensors 10a, 10b, and 10c, respectively. Light components forming the images of objects to be photographed are converted into electrical image signals, A/D-converted by A/D converters 11a, 11b, and 11c, and stored in memories 12a, 12b, and 12c, respectively. The stored image signals are supplied to an operational circuit 14 via gates 13a, 13b, and 13c, respectively.

The operational circuit 14 is connected to a lens data generator 15 in the lens LE when the lens LE is mounted. The lens data generator 15 supplies lens data about, e.g., a lens moving amount per unit rotation of the driving shaft 3 shown in FIG. 2 to the operational circuit 14. The operational circuit 14 performs a defocus detection operation on the basis of the input image signal and determines a difference between an imaging plane of the lens LE and an expected imaging plane on the film surface, i.e., a defocus amount and a defocus direction. On the basis of the determined defocus amount and defocus direction and the input lens data, the operational circuit 14 determines a lens driving amount for focusing the lens LE on a predetermined object to be photographed as will be described later.

The determined lens driving amount is supplied to the control circuit 16. The control circuit 16 is connected to a motor drive circuit 17 for driving a focusing motor 18 and forms and supplies a predetermined lens drive signal to the motor drive circuit 17 on the basis of the input lens drive amount. The motor drive circuit 17 drives the lens LE to a focus position in accordance with the lens drive signal.

The control circuit 16 is connected to an exposure control circuit 19 and switches SW1 and SW2 interlocked with the release button 4 (FIG. 2). The switch SW1 is turned on upon depressing operation (initial operation) of the release button 4 to the first stroke, and the switch SW2 is turned on upon depressing operation of the release button 4 to the second stroke. The exposure control circuit 19 drives exposure control devices (not shown) such as an aperture and a shutter in accordance with a command from the control circuit 16, thereby performing photographing.

The control circuit 16 is also connected to the focusing mode selector 5 and the focus lock 6 described above and sets one of the above focusing modes in accordance with a position of the focusing mode selector 5. When the focus lock 6 is operated in the C-AF mode, the lens LE is fixed at a current position. When the focus lock 6 is operated after the lens LE is focused on a predetermined object to be photographed in the S-AF mode, a focus position of the lens LE is changed as will be described below. In this case, the focus lock 6 is kept ON only while it is operated and turned off when the operation is canceled.

The sensors 10a, 10b, and 10c and the operational circuit 14 in FIG. 3 correspond to the focus condition detector 101 in FIG. 1. Similarly, the motor drive circuit 17 and the motor 18 correspond to the lens driver 102, the control circuit 16 corresponds to the controller 103, and the focus lock 6 corresponds to the operating member 104.

That is, upon initial operation of the release button 4, the lens driver 102 is controlled such that the lens LE is moved to a closest focus position for focusing the lens on a closest one of objects to be photographed in focus detection areas or a farthest focus position for focusing the lens on a farthest object to be photographed thereof. When the operating member 104 is operated while the lens LE is located at the closest or farthest focus position upon initial operation of the release button 4, the lens driver 102 is controlled accordingly on the basis of detected focus conditions such that a focus position of the lens LE at the closest focus position is sequentially shifted to focus the lens on an object to be photographed in a focus detection area farther by one step or a focus position of the lens LE at the farthest focus position is sequentially shifted to focus the lens on an object to be photographed in a focus detection area closer by one step.

The mode selector 5 can select the S-AF mode in which the lens LE is focused on an object to be photographed upon initial operation of the release button 4 and fixed at the position after it is focused, or the C-AF mode in which the focus condition detector 101 is repeatedly operated while the initial operation of the release button 4 is performed, thereby focusing the lens LE on a desired object to be photographed. The controller 103 is arranged to be operable in either the S-AF mode or C-AF mode by operating the mode selector 5. That is, when the focus lock is operated in the C-AF mode, the lens LE is fixed at a current position. When the focus lock is operated in the S-AF mode, the focus lock functions as the operating member 104.

Therefore, the controller 103 controls the lens driver in accordance with the initial operation of photographing to move the lens to the closest focus position for focusing the lens on the closest object to be photographed or the farthest focus position for focusing the lens on the farthest object to be photographed. When the operating member 104 is operated while the lens is located at the closest or farthest focus position upon initial operation, a focus position of the lens at the closest focus position is sequentially shifted accordingly on the basis of the detected focus conditions such that the lens is focused on an object to be photographed in a focus detection area farther by one step. Alternatively, a focus position of the lens at the farthest focus position is sequentially shifted such that the lens is focused on an object to be photographed in a focus detection area closer by one step.

In this manner, since a user can perform the depressing operation to the first stroke and change a focus position of the lens to a position for focusing the lens on a desired object while observing an object to be photographed, the operability is improved.

When the focus lock is operated in the C-AF mode, the controller 103 fixes the lens at a position set when the focus lock is operated. When the focus lock is operated in the S-AF mode, the controller 103 allows the focus lock to operate as the operating member 104. In this manner, since an operating member need not be additionally provided, an arrangement can be simplified and a manufacturing cost can be decreased.

Figure 5:
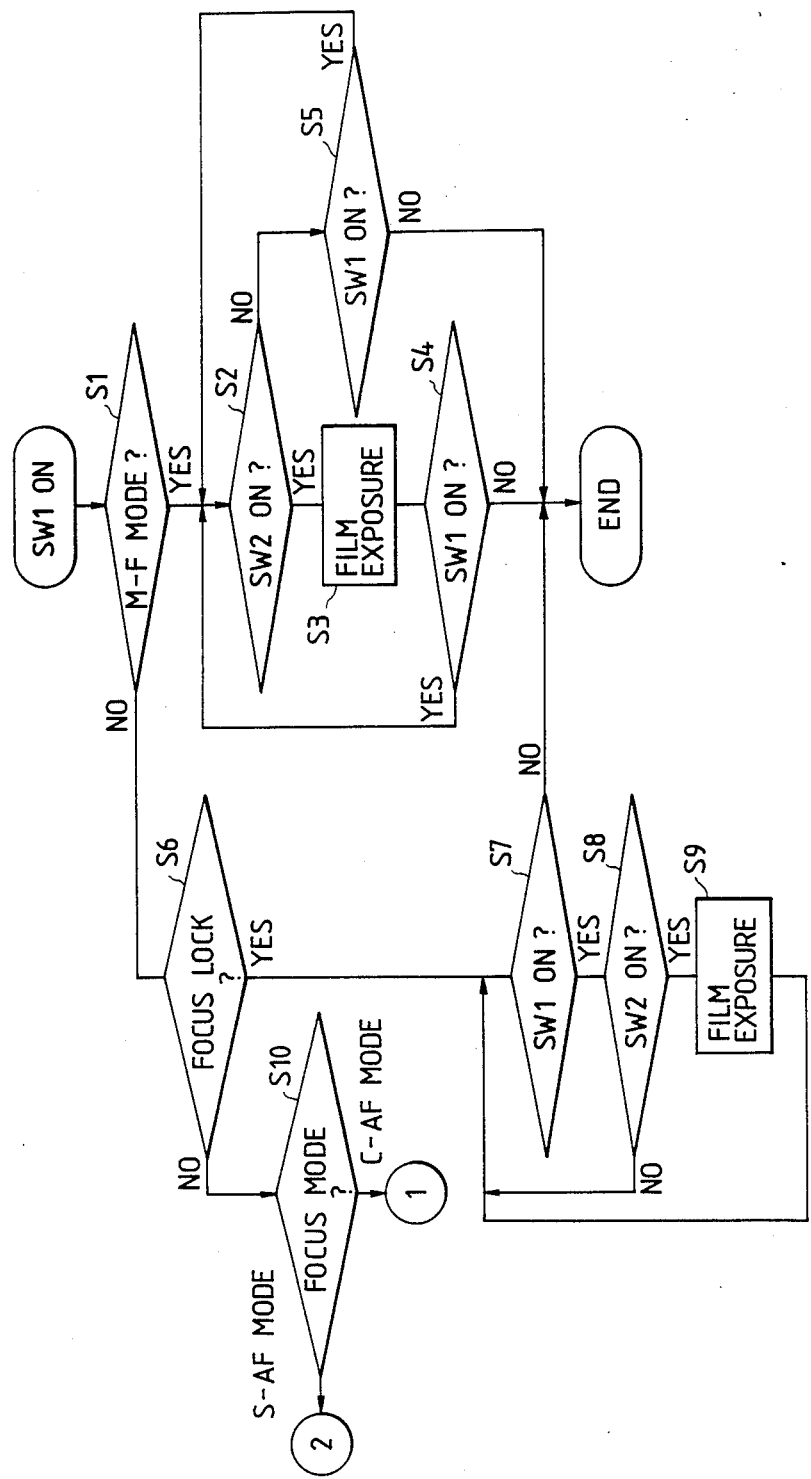
FIGS. 5 to 7 are flow charts for explaining process procedures performed by a control circuit shown in FIG. 3.
Figure 6:
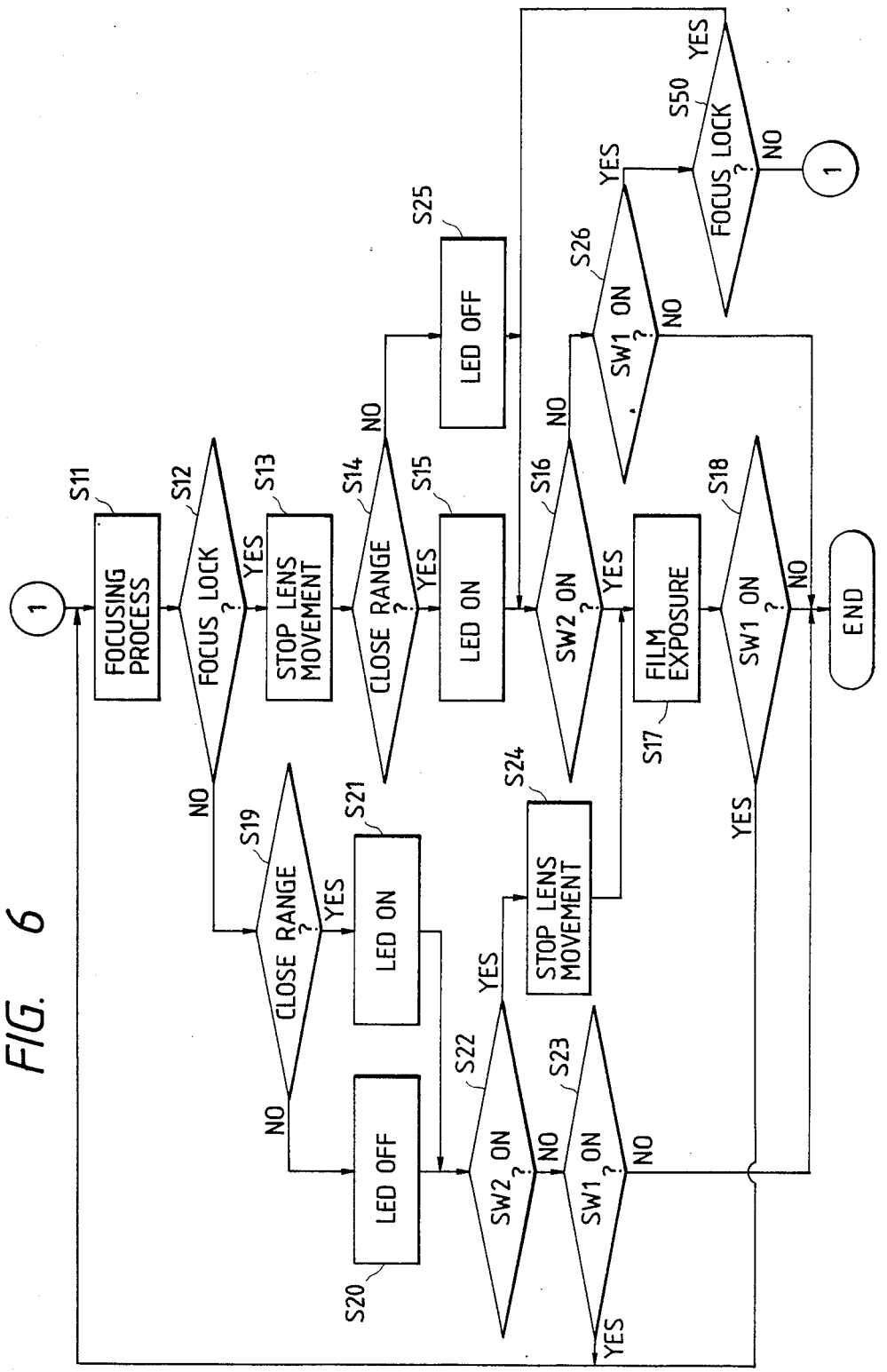

Control procedures performed by the control circuit 16 will be described below with reference to FIGS. 5 to 7.

This program is activated when the first-stroke switch SW1 is operated. In step S1 in FIG. 5, the control circuit 16 checks whether the M-F mode is set by the focusing mode selector 5. If Y (YES) in step S1, the flow advances to step S2, and the control circuit 16 checks whether the second-stroke switch SW2 is turned on. If N (NO) in step S2, the flow advances to step S5, and the control circuit 16 checks whether the first-stroke switch SW1 is turned on. If N in step S5, the process is ended. If Y in step S5, the flow returns to step S2.

If Y in step S2, the flow advances to step S3, the exposure control circuit 19 drives the exposure control devices such as an aperture and a shutter to perform photographing, and then the flow advances to step S4. In step S4, the control circuit 16 checks whether the switch SW1 is kept on. If N in step S4, the process is ended. If Y in step S4, the flow returns to step S2.

If N in step S1, the flow advances to step S6, and the control circuit 16 checks whether the focus lock 6 is turned on. If N in step S6, the flow advances to step S10. If Y in step S6, the flow advances to step S7. In step S7, the control circuit 16 checks whether the switch SW1 is turned on. If N in step S7, the process is ended. If Y in step S7, the flow advances to step S8. In step S8, the control circuit 16 checks whether the switch SW2 is turned on. If N in step S8, the flow returns to step S7. If Y in step S8, the flow advances to step S9. In step S9, the exposure control circuit 19 drives the exposure control devices to perform photographing, and the flow returns to step S7.

In step S10, the control circuit 16 checks a focusing mode set by the focusing mode selector 5. If the control circuit 16 determines in step S10 that the C-AF mode is set, the flow advances to step S11 in FIG. 6, and a series of focusing processes are performed.

That is, the operational circuit 14 fetches image signals from the sensors 10a, 10b, and 10c to perform defocus detection described above and determines defocus amounts and defocus directions corresponding to objects to be photographed located at the focus detection areas 20a, 20b, and 20c, respectively. A defocus amount and a defocus direction corresponding to a closest one (closest object to be photographed) of the objects to be photographed are selected, and a lens driving amount for focusing the lens LE on the closest object to be photographed is determined on the basis of the selected defocus amount and defocus direction and lens information from the lens data generator 15. A lens drive signal is output to the drive circuit 17 to drive the lens LE to a focus position (closest focus position) for focusing the lens on the closest object to be photographed on the basis of the determined lens driving amount. The drive circuit 17 causes the motor 18 to start driving of the lens LE toward the closest focus position.

The flow advances to step S12, and the control circuit 16 checks whether the focus lock 6 is turned on. If Y in step S12, the flow advances to step S13, the lens LE is stopped at a current position by the drive circuit 17, and then the flow advances to step S14. In step S14, the control circuit 16 checks whether the lens LE reaches the closest focus position. If Y in step S14, an indication representing that the lens is focused (to be referred to as a "focus indication" hereinafter) is performed in step S15, and the flow advances to step S16. If N in step S14, an indication representing that the lens is not focused (to be referred to as a "non-focus indication" hereinafter) is performed in step S25, and the flow advances to step S16. In this case, the focus indication is performed by turning on an indication LED in the finder, and the non-focus indication is performed by turning off the LED.

In step S16, the control circuit 16 checks whether the second-stroke switch SW2 is turned on. If N in step S16, the flow advances to step S26, and the control circuit 16 checks whether the first-stroke switch SW1 is turned on. If N in step S26, the process is ended. If Y in step S26, the flow advances to step S50. In step S50, the control circuit 16 checks whether the focus lock 6 is turned on. If Y in step S50, the flow returns to step S16. If N in step S50, the flow returns to step S11. If Y in step S16, the flow advances to step S17, the exposure control circuit 19 drives the exposure control devices such as an aperture and a shutter to perform photographing, and the flow advances to step S18. In step S18, the control circuit 16 checks whether the switch SW1 is kept on. If N in step S18, the process is ended. If Y in step S18, the flow returns to step S11.

If N in step S12, the flow advances to step S19, and the control circuit 16 checks whether the lens LE is driven to the closest focus position. If Y in step S19, the focus indication is performed in step S21, and the flow advances to step S22. If N in step S19, the non-focus indication is performed in step S20, and the flow advances to step S22. In step S22, the control circuit 16 checks whether the switch SW2 is turned on. If Y in step S22, the lens LE is stopped at a current position in step S24, and the flow advances to step S17 to perform photographing. If N in step S22, the control circuit 16 checks in step S23 whether the switch SW1 is turned on. If N in step S23, the process is ended. If Y in step S22, the flow returns to step S11, and the above process is repeated.

Figure 7:
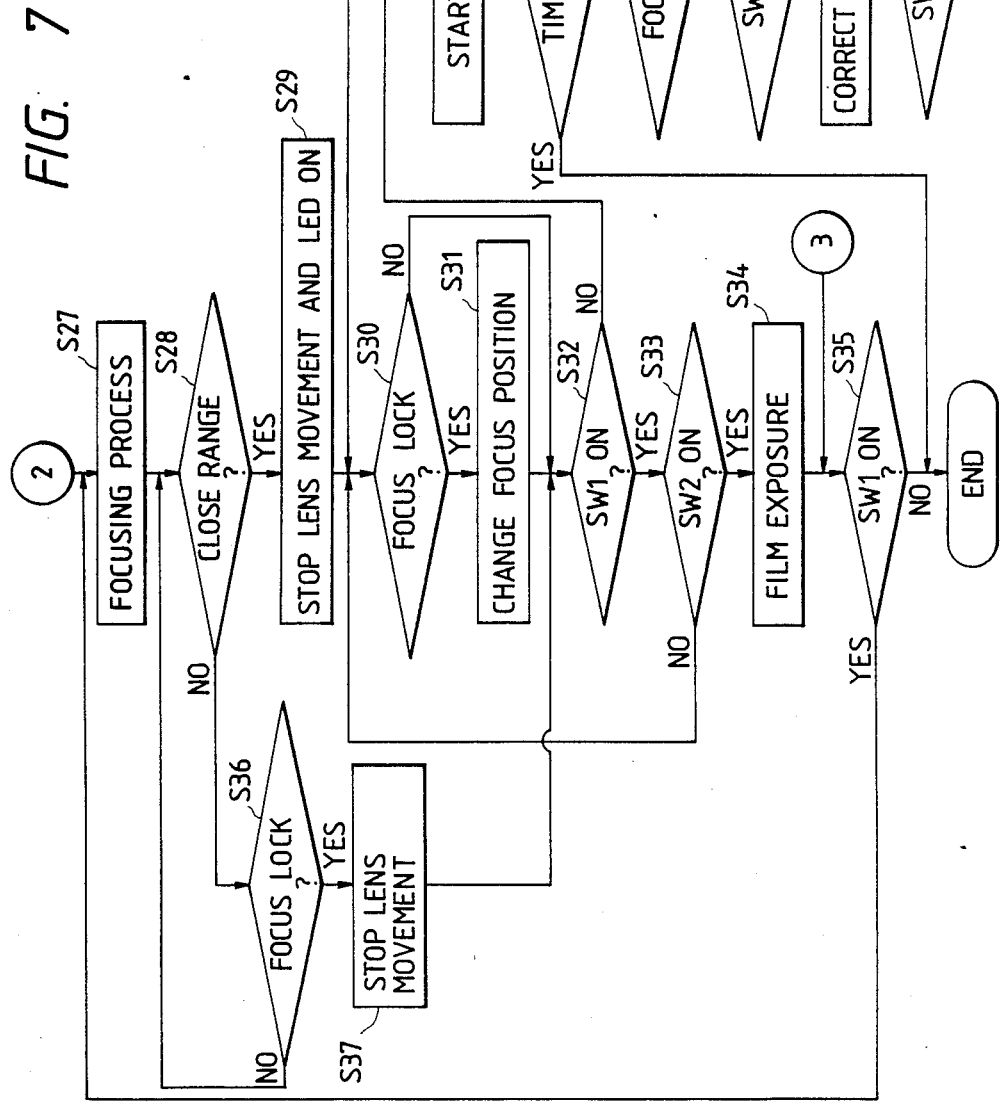

If the control circuit 16 determines in step S10 (FIG. 5) that the S-AF mode is set, the flow advances to step S27 in FIG. 7, and a series of focusing processes are performed as in step S11. That is, a lens drive signal is output to drive the lens LE to the closest position for focusing the lens on the closest one of the objects to be photographed on the basis of the determined lens driving amount. The drive circuit 17 causes the motor 18 to start driving of the lens LE toward the closest focus position.

In step S28, the control circuit 16 checks whether the lens LE reaches the closest focus position. If Y in step S28, the lens LE is stopped and the LED is turned on to perform the focus indication in step S29, and the flow advances to step S30. In step S30, the control circuit 16 checks whether the focus lock 6 is switched from OFF to ON. If N in step S30, the flow advances to step S32. That is, in order to execute step S31, the focus lock 6 must be turned off immediately before step S30.

If Y in step S30, a focus position of the lens LE is changed in step S31.

That is, assume that a position for focusing the lens LE on a closest one of the objects to be photographed corresponding to the images in the focus detection areas 20a, 20b, and 20c shown in FIG. 4 is a closest focus position, a position for focusing the lens LE on an intermediate one of the objects to be photographed is an intermediate focusing position, and a position for focusing the lens LE on a farthest one of the objects to be photographed is a farthest focus position. When the lens LE is currently located at the closest focus position, a focus position of the lens LE is changed to the intermediate focus position. When the lens LE is located at the intermediate focus position, a focus position of the lens LE is changed to the farthest focus position. When the lens LE is located at the farthest focus position, a focus position of the lens LE is changed to the closest focus position. At this time, a lens driving amount for driving the lens LE is determined by the defocus amount and the defocus direction corresponding to the object to be photographed determined in step S27.

After the focus position is changed in step S31, the flow advances to step S32, and the control circuit 16 checks whether the switch SW1 is turned on. If Y in step S32, the flow advances to step S33, and the control circuit 16 checks whether the switch SW2 is turned on. If Y in step S33, the flow advances to step S34, and the exposure control circuit 19 drives the exposure control devices to perform photographing. In step S35, the control circuit 16 checks whether the switch SW1 is kept ON. If N in step S35, the process is ended. If Y in step S35, the flow returns to step S27, and the above process is repeated. If N in step S33, the flow returns to step S30.

If N in step S32, the flow advances to step S39, and a timer is activated to start measuring a predetermined time. In step S40, the control circuit 16 checks whether the predetermined time elapses. If Y in step S40, the process is ended. If N in step S40, the control circuit 16 checks in step S41 whether the focus lock 6 is kept on from the ON determination in step S30. If N in step S41, the flow advances to step S35. If Y in step S41, the control circuit 16 checks in step S42 whether the switch SW1 is turned on. If N in step S42, the flow returns to step S40. If Y in step S42, the flow advances to step S43.

In step S43, a focus position of the lens LE is corrected. That is, when the focus position of the lens LE is changed in step S31, the lens driving amount is determined by the defocus amount and the defocus direction determined in step S27. For this reason, if an object to be photographed moves after that, the lens LE may not be focused on the object to be photographed even when the lens is driven. Therefore, in step S43, the focus position of the lens LE is corrected in order to focus the lens LE on a predetermined object to be photographed. More specifically, the sensors 10a, 10b, and 10c are activated to output image signals, and the operational circuit 14 fetches the image signals and determines defocus amounts and defocus directions. On the basis of the obtained result, the lens LE is driven from a current position to a focus position closest to the current position. In this manner, even if an object on which the lens is to be focused more or less moves, the lens can be driven to a focus position for focusing the lens on the object to be photographed.

The flow then advances to step S44, and the control circuit 16 checks whether the switch SW1 is turned on. If N in step S44, the flow returns to step S39. If Y in step S44, the flow returns to step S30.

If N in step S28, the flow advances to step S36, and the control circuit 16 checks whether the focus lock 6 is turned on. If N in step S36, the flow returns to step S28. If Y in step S36, the lens LE is stopped at a current position, and the flow advances to step S32. That is, when the focus lock 6 is operated before the lens LE is focused on the closest object to be photographed, the lens LE is stopped at a current position.

In the above procedure, when the release button 4 is depressed to the first stroke in the C-AF mode, the lens is driven to the closes focus position for focusing the lens on the closest one of the objects to be photographed located in the focus detection areas 20a, 20b, and 20c shown in FIG. 4. Thereafter, when the focus lock 6 is operated while the release button 4 is kept depressed to the first stroke, a focus position of the lens LE is sequentially shifted to a position for focusing the lens LE on an object to be photographed farther by one step each time the focus lock 6 is operated.

More specifically, in FIG. 4, assume that the object to be photographed (person) in the focus detection area 20a is the closest object to be photographed, the object to be photographed (automobile) in the area 20b is the intermediate object to be photographed, and the object to be photographed (mountain) in the area 20c is the farthest object to be photographed. In this case, when the release button 4 is depressed to the first stroke, the lens LE is driven to a focus position for focusing the lens on the person at the closest position. Thereafter, when the focus lock 6 is operated once while the depressing operation to the first stroke is continued, the lens LE is driven to a focus position for focusing the lens on the automobile at the intermediate position. When the focus lock 6 is operated again, the lens LE is driven to a focus position for focusing the lens on the mountain at the farthest position. In this state, when the focus lock 6 is operated again, the lens LE is driven to the focus position for focusing the lens on the person at the closest position. Thereafter, the focus position is repeatedly changed each time the focus lock 6 is operated.

When the depressing operation to the first stroke and the operation of the focus lock 6 are simultaneously performed within a predetermined time interval after the depressing operation of the release button 4 to the first stroke is canceled, the focus position of the lens LE is corrected as described above.

In the above description, the number of the focus detection areas is three as shown in FIG. 4. However, four or more focus detection areas can be set. In addition, the focus position of the lens LE is shifted each time the focus lock 6 is operated. However, when the focus lock 6 is continuously operated, the focus position of the lens LE may be shifted upon each predetermined time period.

Furthermore, to the contrary to the above operation, the lens may be driven to the farthest focus position upon depressing operation of the release button 4 to the first stroke and shifted to the position for focusing the lens on the closest object to be photographed upon operation of the focus lock 6.

The operating member for shifting the focus position of the lens LE is not limited to the focus lock 6 but can be an exclusive operating member.

In the above description, a so-called TTL phase difference detection system often used in a single-lens reflex camera is adopted as the focus detection system. However, the focus detection system is not limited to the above system but can be, e.g., an active distance measuring system.

In the above first embodiment, upon initial operation (e.g., the depressing operation to the first stroke) of the release operating member (e.g., the release button 4), the lens is moved to the closest focus position for focusing the lens on the closest object to be photographed or the farthest focus position for focusing the lens on the farthest object to be photographed. Thereafter, when the focus position change operating member (e.g., the focus lock 6) is operated, the focus position of the lens located at the closest focus position is sequentially shifted to a focus position for focusing the lens on an object to be photographed farther by one step, or that of the lens located at the farthest focus position is sequentially shifted to a focus position for focusing an object to be photographed closer by one step. In this manner, since a user can perform the depressing operation to the first stroke and change the focus position of the lens to a position for focusing a desired object to be photographed while observing the object to be photographed through the finder, the operability is improved.

In addition, in the first embodiment, when the focus lock operating member is operated in the C-AF mode, the lens is fixed at a current position. When the focus lock operating member is operated in the S-AF mode, the focus lock operating member is allowed to function as the above focus position change operating member. Therefore, since a focus position change operating member need not be additionally provided, an arrangement can be simplified, and a manufacturing cost can be decreased.

Figure 8:
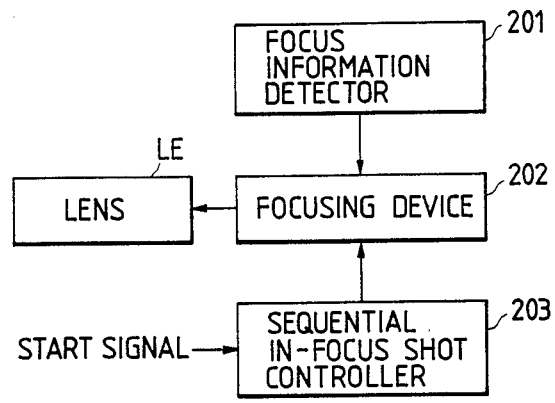
FIG. 8 is a block diagram showing a main part of a schematic arrangement according to a second embodiment of the present invention.
Figure 9:
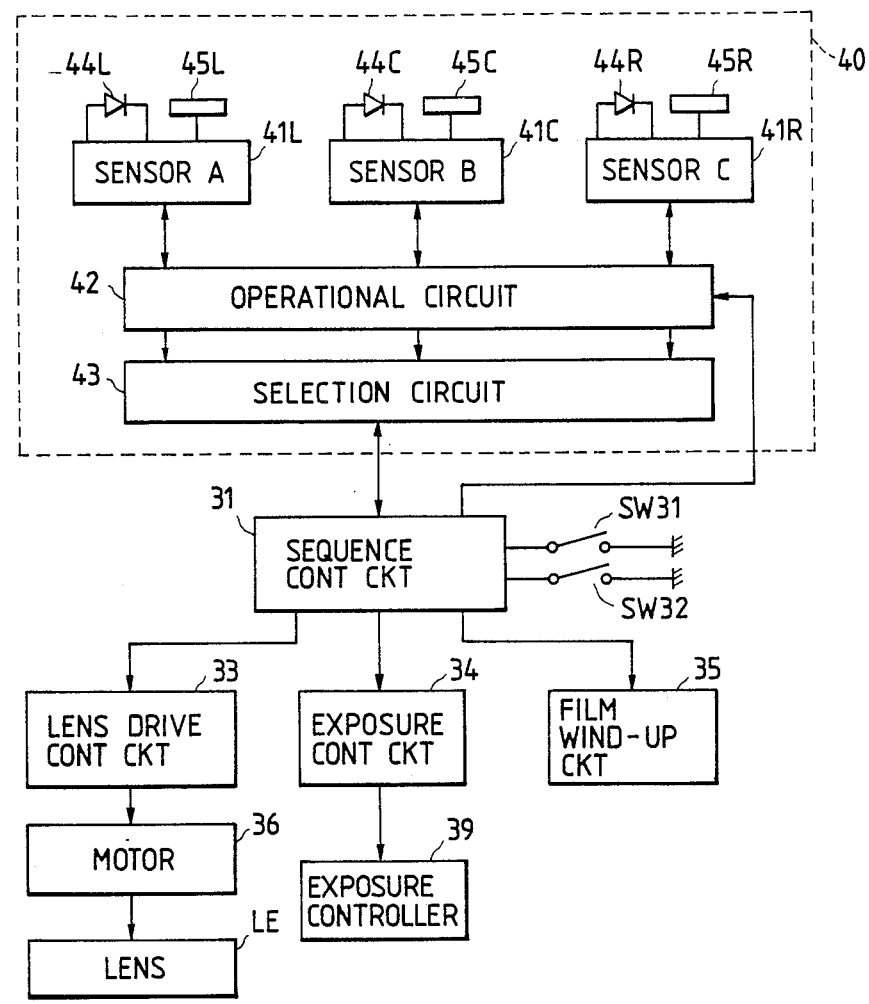
FIG. 9 is a block diagram showing a control system according to the second embodiment of the present invention.

FIG. 8 shows a schematic arrangement of a second embodiment of the present invention, and FIG. 9 shows an overall arrangement of a control system. An arrangement of the second embodiment will be described below with reference to FIGS. 8 and 9.

An AF camera shown in FIG. 8 comprises a focus information detector 201 for detecting focus information concerning objects to be photographed located in a plurality of focus detection areas in a field, a focusing device 202 for focusing a photographic lens LE on the basis of the detected focus information, and a sequential in-focus shot controller 203 for sequentially focusing the lens LE on the objects to be photographed in the focus detection areas when the focusing device 202 is operated upon input of a photographing start signal, thereby performing photographing. That is, this camera is arranged so that a photograph in focus with a desired object to be photographed is always taken.

Referring to FIG. 9 showing the overall arrangement, a sequence control circuit 31 for controlling a sequence of the entire camera is connected to a lens drive control circuit 33, an exposure control circuit 34, and a film wind-up circuit 35. The lens drive control circuit 33 is connected to a motor 36. The lens drive control circuit 33 causes the motor 36 to drive the lens LE to a predetermined focusing position in accordance with a lens drive signal from the sequence control circuit 31. The exposure control circuit 34 drives an exposure controller 39 such as a diaphragm or shutter in accordance with a command from the sequence control circuit 31. The film wind-up circuit 35 winds up one frame of a film in response to a wind-up signal from the sequence control circuit 31. The sequence control circuit 31 is also connected to a distance measuring circuit 40. The distance measuring circuit 40 corresponds to the focus information detector 201. Similarly, the lens drive control circuit 33 and the motor 36 correspond to the focusing device 202, and the sequence control circuit 31 corresponds to the sequential in-focus shot controller 203.

The distance measuring circuit 40 comprises three sensors 41L, 41C, and 41R, an operational circuit 42, and a selection circuit 43. The sensors 41L, 41C, and 41R include light-emitting elements 44L, 44C, and 44R for emitting light on objects to be photographed and light-receiving elements 45L, 45C, and 45R for receiving reflected light from the objects to be photographed, respectively. The operational circuit 42 activates the sensors 41L, 41C, and 41R in accordance with a distance measurement start signal from the sequence control circuit 31 so that the emitted light components from the light-emitting elements 44L, 44C, and 44R are guided to the objects to be photographed located in distance measurement zones $Z_L$, $Z_C$, and $Z_R$ in a field W shown in FIG. 10, respectively. The distance measurement zone $Z_C$ is located at the center of the field, and the distance measurement zones $Z_L$ and $Z_R$ are located at both the sides of the zone $Z_C$ to correspond to each other.

Each of the light-receiving elements 45L, 45C, and 45R supplies a detection signal according to a light-receiving position reached by reflected light from a corresponding object to be photographed to the operational circuit 42. On the basis of the input detection signals, the operational circuit 42 determines distances to the objects to be photographed located in the three distance measurement zones $Z_L$, $Z_C$, and $Z_R$, i.e., distance measurement values and supplies the determined values to to the selection circuit 43. The selection circuit 43 normally selects a closest one of the three input measurement distance values and supplies the selected value to the sequence control circuit 31. If the three distance measurement values are similar to each other, a distance measurement value in the central distance measurement zone $Z_C$ may be selected and set. If the distance measurement values are within a depth of field of the lens LE, an average value of the distance measurement values may be calculated and set.

The sequence control circuit 31 is connected to switches SW31 and SW32. The switch SW31 is a release switch interlocked with an operation of a release button. When the release switch SW31 is turned on, a photographing start signal is supplied to the sequence control circuit 31. In response to the photographing start signal, the sequence control circuit 31 activates the above circuits.

The switch SW32 is interlocked with an operation of an auto focus bracketing (AFB) setting button. When the switch SW32 is turned on, the sequence control circuit 31 sets an AFB mode. If the release switch SW31 is turned on after that, the sequence control circuit 31 outputs an AFB signal to the selection circuit 43. When the selection circuit 43 receives the AFB signal, it supplies all the distance measurement values from the operational circuit 42 to the sequence control circuit 31.

A photographing sequence performed by the sequence control circuit 31 when the AFB mode is set will be described below with reference to flow charts shown in FIGS. 11 and 12.

Figure 11:
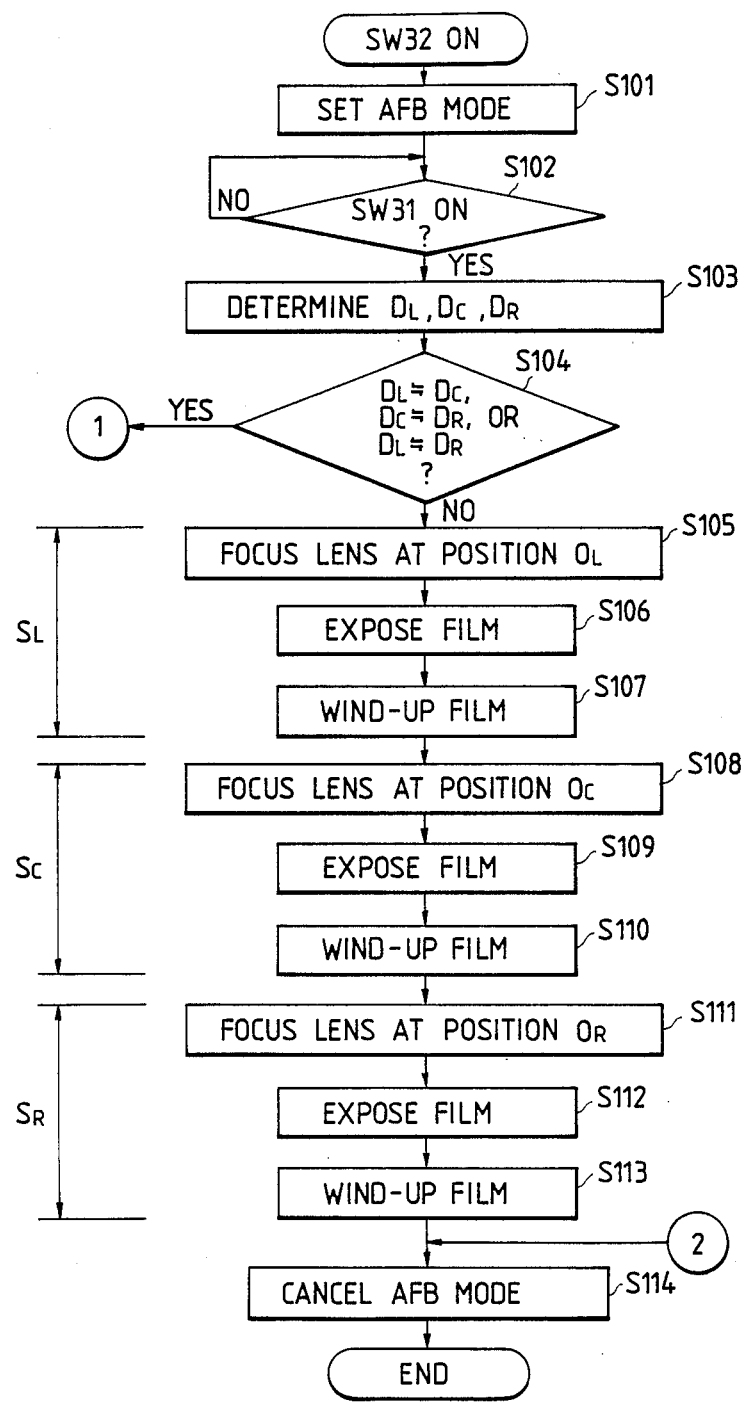
FIGS. 11 and 12 are flow charts showing a process procedure performed by a sequence control circuit shown in FIG. 9 when an AFB mode is set.
Figure 12:
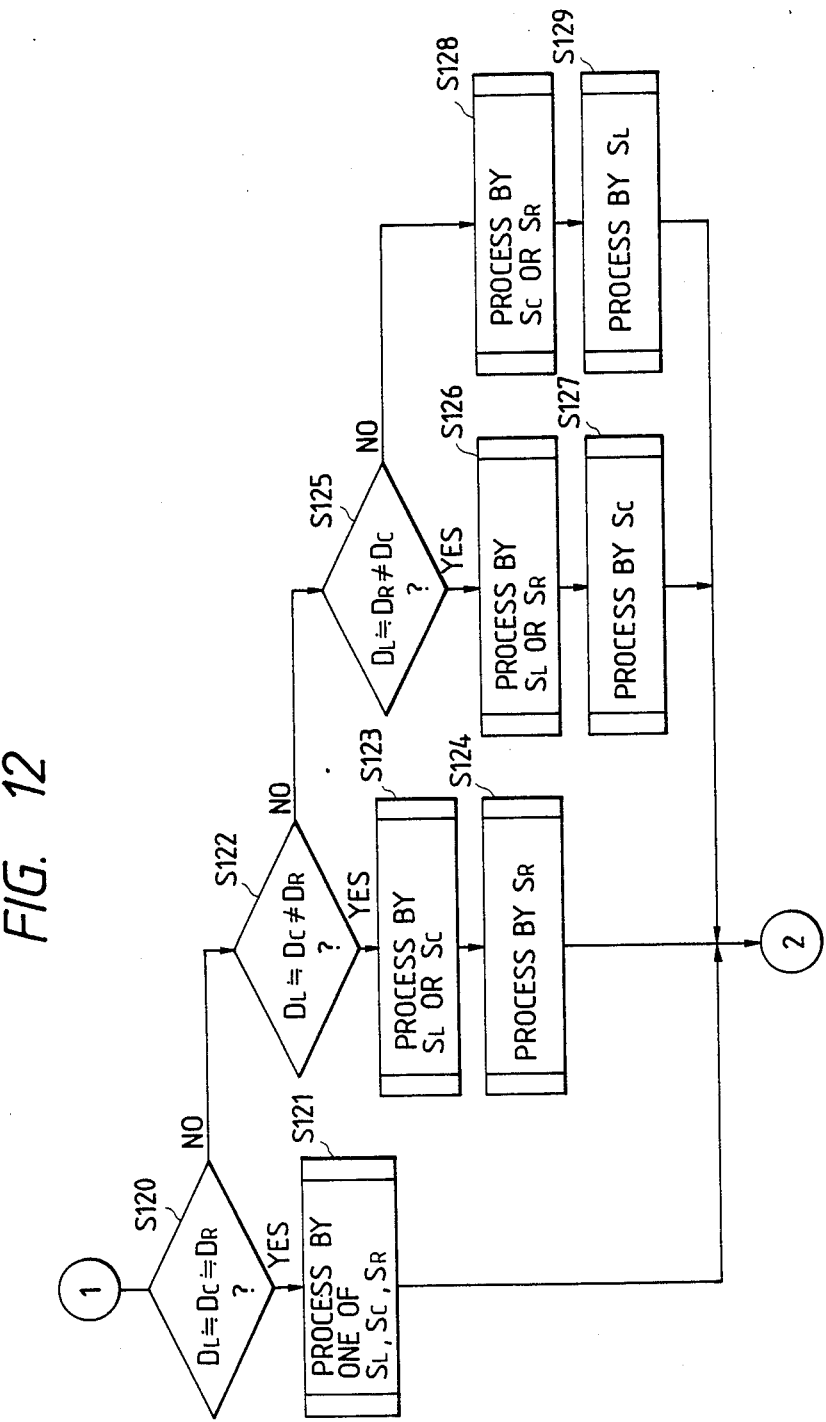

When the AFB setting button is operated to turn on the switch SW32, the sequence control circuit 31 activates the programs shown in FIGS. 11 and 12 and sets the AFB mode in step S101 in FIG. 11. In step S102, the sequence control circuit 31 checks whether the release switch SW31 is turned on. If N in step S102, the flow stays in step S102 until Y is determined in S102. If Y in step S102, the flow advances to step S103, and the sequence control circuit 31 outputs a distance measurement start signal and an AFB signal to the operational circuit 42 and the selection circuit 43, respectively. When the distance measurement start signal is output, the sensors 41L, 41C, and 41R are activated, and the operational circuit 42 calculates distance measurement values $D_L$, $D_C$, and $D_R$ in the distance measurement zones $Z_L$, $Z_C$, and $Z_R$ (FIG. 3) on the basis of detection signals from the sensors 41L, 41C, and 41R, respectively, and supplies the calculated values to the selection circuit 43. Since the AFB signal is supplied to the selection circuit 43, the selection circuit 43 supplies all of the distance measurement values $D_L$, $D_C$, and $D_R$ to the sequence control circuit 31.

In step S104, the sequence control circuit 31 checks whether at least two of the three input distance measurement values $D_L$, $D_C$, and $D_R$ fall within a predetermined approximate range.

Figure 13A:
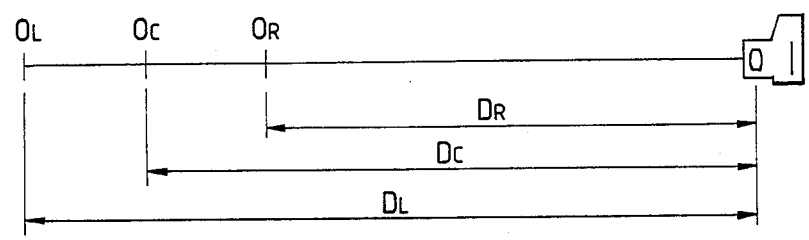
Figure 13B:
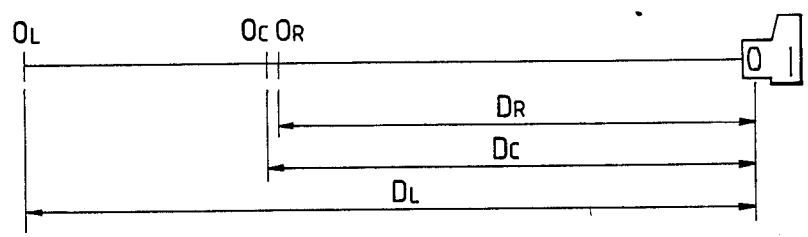

FIGS. 13A and 13B show a positional relationship between the camera and the objects to be photographed. Referring to FIGS. 13A and 13B, object positions $O_L$, $O_C$, and $O_R$ correspond to the objects to be photographed in the distance measurement zones $Z_L$, $Z_C$, and $Z_R$ (FIG. 3), respectively, and the distance measurement values $D_L$, $D_C$, and $D_R$ represent distances thereto. FIG. 13A shows a state in which the distance measurement values $D_L$, $D_C$, and $D_R$ fall outside the predetermined approximate range, and FIG. 13B shows a state in which the distance measurement values $D_C$ and $D_R$ fall within the predetermined approximate range. When the two distance measurement values $D_C$ and $D_R$ fall within the predetermined approximate range, the object position $O_C$ corresponding to the distance measurement value $D_C$ is included in a depth of field of a closer one (in this case, $D_R$) of the distance measurement values $D_C$ and $D_R$. When the two distance measurement values $D_C$ and $D_R$ satisfy the above relationship, this is represented as "$D_C \doteq D_R$". When the above relationship is not satisfied, this is represented as "$D_C \neq D_R$".

When the distance measurement values $D_L$, $D_C$, and $D_R$ fall outside the approximate range as shown in FIG. 13A, N is determined in step S104 and the flow advances to step S105 in FIG. 11. In step S105, a lens driving amount $M_L$ is determined on the basis of the distance measurement value $D_L$ corresponding to the position $O_L$ of the farthest object to be photographed, and a lens drive signal corresponding to the lens driving amount $M_L$ is output. The lens drive control circuit 33 drives the motor 36 to focus the lens LE on the object to be photographed located in the distance measurement zone $Z_L$, and the flow advances to step S106.

In step S106, the exposure control circuit 34 drives the exposure controller 39 such as a diaphragm and a shutter to perform photographing. Thereafter, in step S107, the wind-up circuit 35 winds up a film (not shown) by one frame. A process from steps S105 to S107 will be referred to as a photographing sequence $S_L$.

In step S108, a lens driving amount $M_C$ is determined on the basis of the distance measurement value $D_C$ corresponding to the position $O_C$ of the intermediate object to be photographed, and a lens drive signal corresponding to the lens driving amount $M_C$ is output, thereby focusing the lens LE on the object to be photographed located in the distance measurement zone $Z_C$. In step S109, photographing is performed as described above. In step S110, the film is wound up by one frame. A process from steps S108 to S110 will be referred to as a photographing sequence $S_C$ hereinafter.

In step S111, a lens driving amount $M_R$ is determined on the basis of the distance measurement value $D_R$ corresponding to the position $O_R$ of the closest object to be photographed, and a lens drive signal corresponding to the lens driving amount $M_R$ is output, thereby focusing the lens LE on the object to be photographed located in the distance measurement zone $Z_R$. Photographing is performed in step S112, and the film is wound up by one frame in step S113. A process from steps S111 to S113 will be referred to as a photographing sequence $S_R$ hereinafter. Thereafter, in step S114, the AFB mode is canceled to end the process. That is, in this case, three photographing operations are continuously performed.

If Y is determined in step S104, the flow advances to step S120, and the sequence control circuit 31 checks whether $D_L \doteq D_C \doteq D_R$, i.e., both the objects to be photographed corresponding to two of the distance measurement values $D_L$, $D_C$, and $D_R$ other than the smallest one thereof are included in a depth of field corresponding to the smallest one. If Y in step S120, photographing is performed once in accordance with one of the photographing sequences $S_L$, $S_C$, and $S_R$ based on the smallest distance measurement value in step S121, and the flow advances to step S114 shown in FIG. 11. That is, when the distance measurement value $D_L$ is smallest, the photographing sequence $S_L$ is performed.

If N in step S120, the flow advances to step S122, and the sequence control circuit 31 checks whether $D_L \doteq D_C \neq D_R$. If Y in step S122, one of the photographing sequences $S_L$ and $S_C$ based on the smaller distance measurement value is performed in step S123. In step S124, the photographing sequence $S_R$ is performed, and the flow advances to step S114 in FIG. 11. That is, in this case, two photographing operations are continuously performed.

If N in step S122, the sequence control circuit 31 checks whether $D_L \doteq D_R \neq D_C$ in step S125. If Y in step S125, one of the photographing sequences $S_L$ and $S_R$ based on the smaller distance measurement value is performed in step S126. In step S127, the photographing sequence $S_C$ is performed, and the flow advances to step S114 in FIG. 11. In this case, two photographing operations are continuously performed.

If N in step S125, i.e., if $D_C \doteq D_R \neq D_L$ is not determined in step S125, one of the photographing sequences $S_C$ and $S_R$ based on the smaller distance measurement value is executed in step S128. In step S129, the photographing sequence $S_L$ is performed, and the flow advances to step S114 in FIG. 11. In this case, two photographing operations are continuously performed.

In the above procedure, when the three distance measurement values $D_L$, $D_C$, and $D_R$ are not included in the predetermined approximate range as shown in FIG. 13A in the AFB mode, photographing is performed once at each focus position based on each of the distance measurement values $D_L$, $D_C$, and $D_R$, i.e., photographing is continuously performed three times. Therefore, even when a user is a beginner or photographing is to be performed by remote control or using a self-timer, at least one of three photographs can be taken in focus with a desired object to be photographed.

When two of the distance measurement values $D_L$, $D_C$, and $D_R$ are included in the predetermined approximate range as shown in FIG. 13B, photographing is performed once for each of the two distance measurement values. Therefore, photographing is performed twice. When the two distance measurement values are included in the predetermined approximate range, an object to be photographed corresponding to one of the two distance measurement values other than a smaller one is included in a depth of field of the smaller one, as described above. Therefore, focusing on the objects to be photographed corresponding to the two distance measurement values can be attained by performing photographing once. When all the distance measurement values $D_L$, $D_C$, and $D_R$ are included in the predetermined approximate range, photographing is performed only once for the three values. In this case, not only a photograph in focus with a desired object to be photographed can be taken as described, but also the number of photographs can be minimized.

Figure 10:
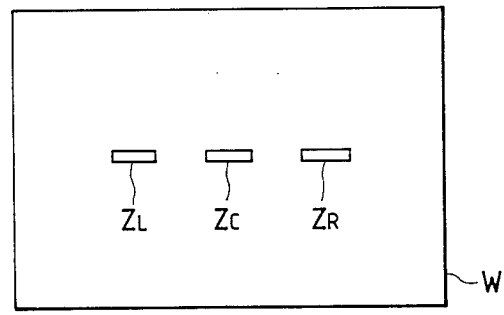
FIG. 10 is a plan view showing distance measurement zones in a field according to the second embodiment.

In the above embodiment, the number of distance measurement zones is three as shown in FIG. 10. However, the number of zones can be two or four or more. In addition, the distance measurement zones are aligned in the horizontal direction within an angle of view. However, the zones can be aligned in the vertical direction within the angle of view or in both the horizontal and vertical directions.

In the above embodiment, the distance measurement values $D_L$, $D_C$, and $D_R$ are simultaneously determined before the three photographing sequences $S_L$, $S_C$, and $S_R$ are executed. However, when each of the photographing sequences $D_L$, $D_C$, and $D_R$ is to be executed, a corresponding one of the distance measurement values $D_L$, $D_C$, and $D_R$ can be independently determined before execution.

In the above embodiment, the automatic focusing apparatus is for a camera of a type in which the distance measurement value representing a distance to an object to be photographed is determined as focus information and the lens is driven to a focus position on the basis of the distance measurement value. However, the present invention can be applied to a camera of a type, similar to a single-lens reflex camera described in the first embodiment, in which an offset amount between an imaging plane and an expected imaging plane of an object to be photographed is determined as focus information in place of the distance measurement value and a lens is driven to a focus position on the basis of the offset amount and an offset direction. In this case, if a plurality of pieces of focus information are included in a predetermined depth of focus, photographing is performed once for these pieces of focus information, as described above.

Furthermore, a check button may be additionally provided to be used such that if the check button is depressed in the AFB mode, a lens is sequentially driven to a focus position based on each focus information but photographing is not performed. In this manner, a user can check an object to be photographed on which the lens is focused before photographing, resulting in a convenient operation.

According to the above second embodiment, upon input of the photographing start signal, the lens is sequentially focused on objects to be photographed in a plurality of focus detection areas, and photographing is performed for each of the objects to be photographed. Therefore, even when a user is a beginner or photographing is to be performed by remote control or using a self-timer, at least one photograph in focus with a desired object to be photographed can be reliably taken.

Figure 14:
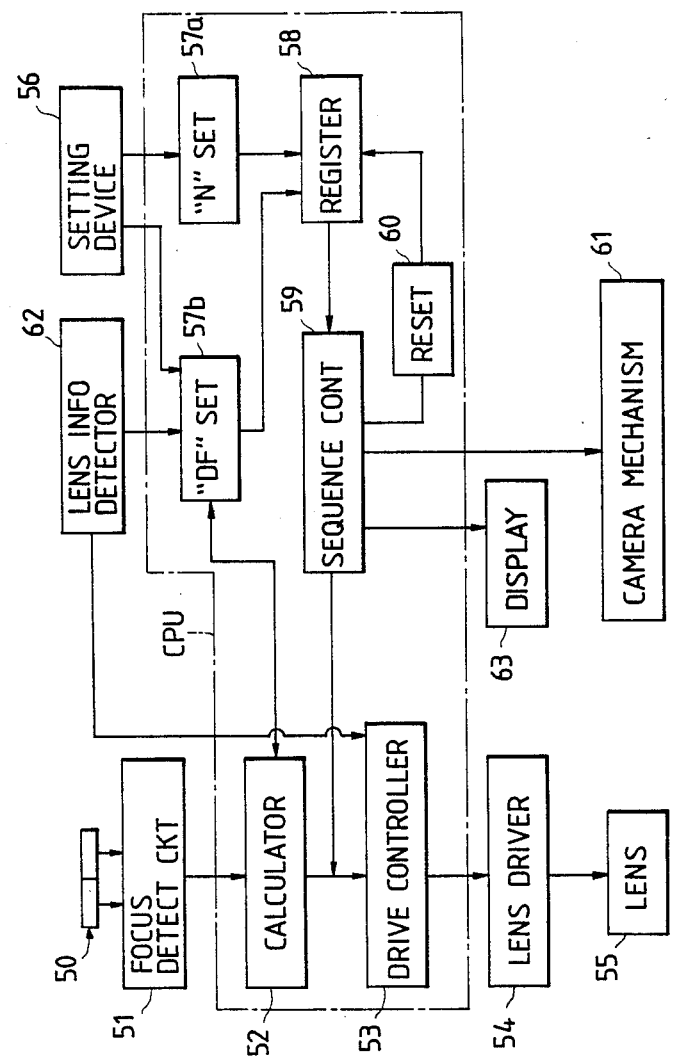
FIG. 14 is a block diagram showing a control system according to a third embodiment of the present invention.
Figure 15:
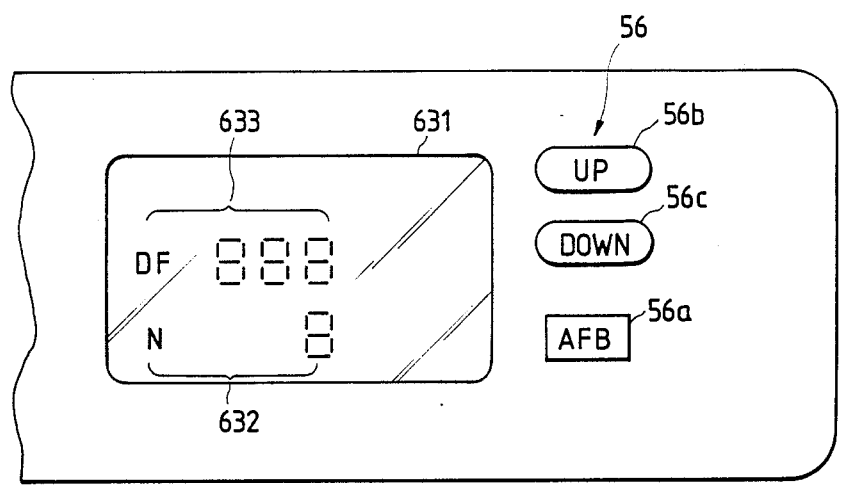
FIG. 15 is a plan view showing an arrangement of a setting device and a display according to the third embodiment.

FIGS. 14 and 15 show a third embodiment of the present invention, in which FIG. 14 shows an operation control apparatus of a camera, and FIG. 15 shows an arrangement of a setting device and a display state of a display.

An arrangement of the operation control apparatus of a camera will be described with reference to FIG. 14.

A focus detect circuit 51 causes a pair of image sensors 50 arranged on a bottom portion of a camera body to photoelectrically convert an image of an object to be photographed formed through a photographic lens 55, and outputs an image signal to a calculator 52. The focus detect circuit 51 may be a focus detect device such as a distance measuring circuit of a triangular distance measuring type.

On the basis of the image signal from the focus detect circuit 51, the calculator 52 determines a defocus amount to a focus position of the lens 55, a depth of focus δ to be described later, and a correction defocus amount DF, and outputs a signal representing a defocus amount to a drive controller 53.

On the basis of the defocus amount signal and lens information (e.g., a focal length, an aperture value, and a gear ratio of a lens driving mechanism) from a lens information detector 62 of the mounted interchangeable lens 55, the drive controller 53 controls a driving amount, a driving direction, a driving timing, and the like of a lens driver 54.

The lens driver 54 includes a motor and a transmitting member for transmitting a driving force of the motor to the mounted interchangeable lens 55 and drives the lens 55 to perform focusing.

As shown in FIG. 15, a setting device 56 is a member exposed outside the camera body and externally operated. The setting device 56 comprises an up button 56b, a down button 56c, and an AF bracketing button 56a for arbitrarily setting the correction defocus amount DF and the number of photographing times N to be described later. When the AF bracketing button 56a is operated, an AF bracketing function (i.e., the lens 55 is slightly offset from its focus position to near- and far-focus positions to perform photographing a plurality of times) is activated.

The number of continuous photographing times is set in an "N" set unit 57a by the AF bracketing button 56a of the setting device 56. A user can set the number of photographing times N by operating the up and down buttons 56b and 56c while monitoring a display 632 for the number of photographing times in a display window 631 of a display 63 shown in FIG. 15.

A "DF" set unit 57b receives aperture value information from the lens information detector 62 of the interchangeable lens 55, causes the calculator 52 to calculate the depth of focus δ, and obtains and sets the correction defocus amount from following equation (1):

$$DF = \delta/M1 \qquad (1)$$

where M1 is an arbitrary number and depth of focus $\delta = \pm F_{NO} \times \epsilon$ (where $F_{NO}$ is the aperture value information and $\epsilon$ is the permissible circle of confusion). M1 may be equal to the set number of photographing times N or optimally set in consideration of, e.g., a depth of field in accordance with a focal length, a distance to an object to be photographed, an aperture value, and the like. In this embodiment, M1=3.

When the AF bracketing button 56a of the setting device 56 is operated, the "DF" set unit 57b sets the correction defocus amount DF (μm) on the basis of equation (1) and displays it on a display 633 for a correction defocus amount in the display window 631 shown in FIG. 15.

A register 58 receives signals corresponding the the number of photographing times N and the correction defocus amount DF from the "N" and "DF" set units 57a and 57b, respectively, and registers the contents of the signals.

A sequence controller 59 sequentially performs driving timing control of the lens 55, an exposure operation, a film wind-up operation, and the like in accordance with predetermined programs and an output from the register 58.

A reset circuit 60 resets the contents of the register 58 when all the operations are finished under the control of the sequence controller 59.

A camera mechanism 61 is a driving mechanism which is controlled by the sequence controller 59 and performs operations except for lens driving such as the exposure operation or the wind-up operation.

The display 63 has a liquid crystal driver and is located in the camera body or data back device.

The calculator 52, the drive controller 53, the "N" set unit 57a, the "DF" set unit 57b, the register 58, the sequence controller 59, and the reset circuit 60 can be constituted by a microcomputer CPU.

Figure 16:
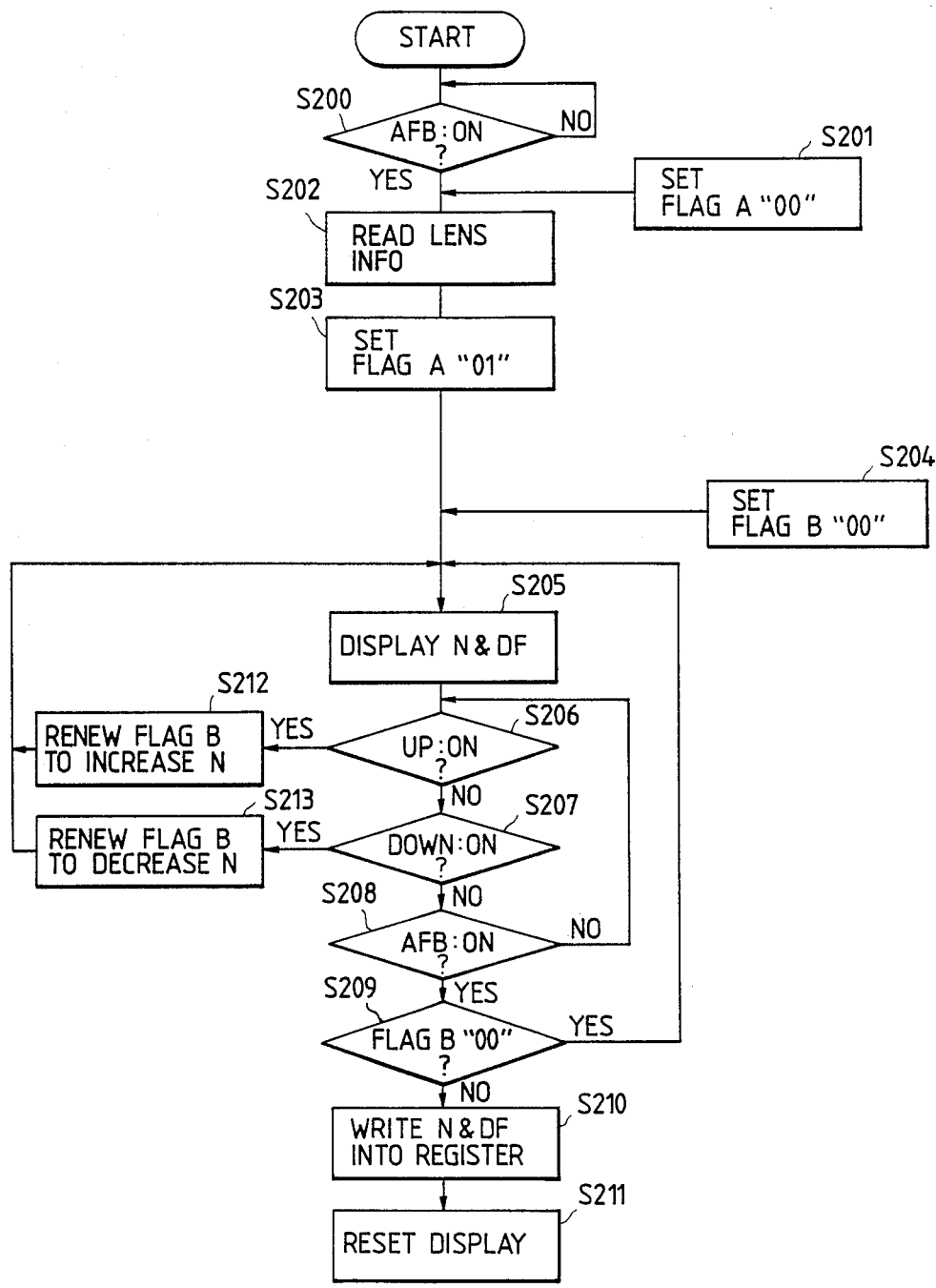
FIG. 16 is a flow chart for explaining a setting operating for setting the number of photographing operations and a correction defocus amount.
Figure 17:
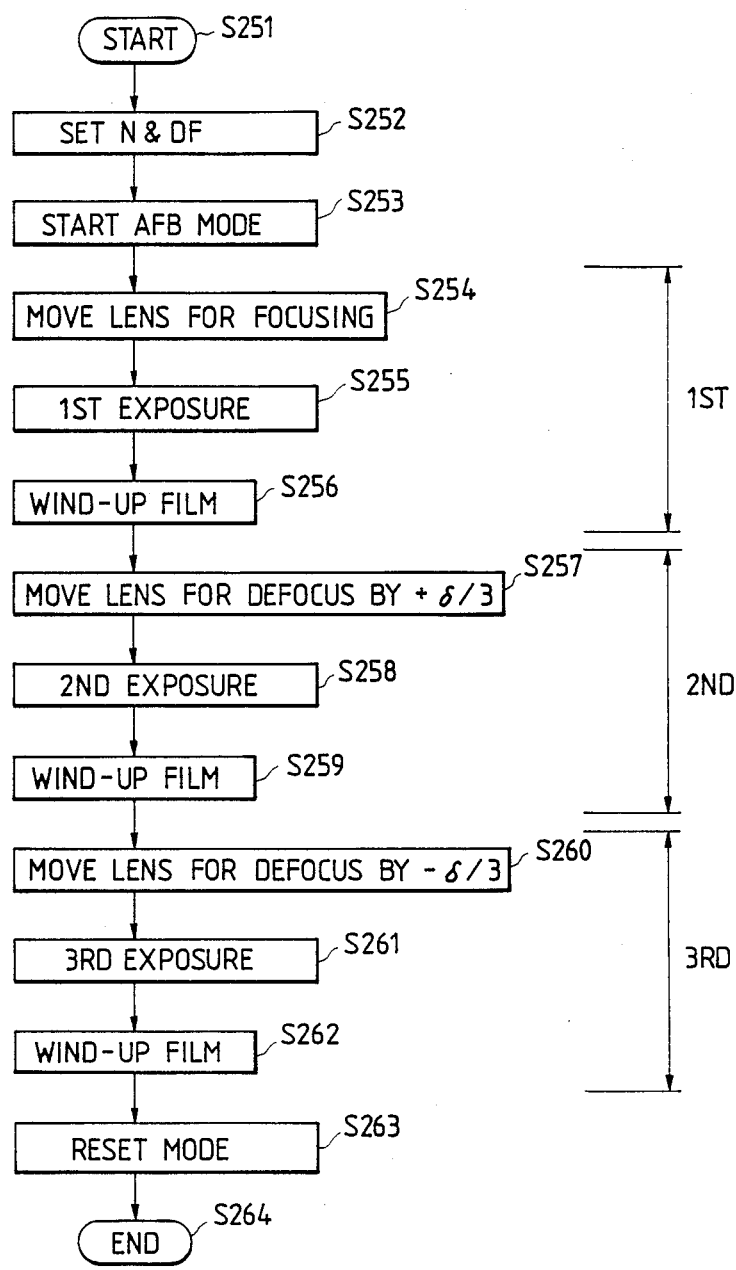
FIG. 17 is a flow chart for explaining an operation of a sequence control circuit according to the third embodiment.

An operation of the CPU will be described below with reference to Table 1 and FIGS. 16 and 17. FIG. 16 is a flow chart for explaining an operation for setting the number of photographing times N and the correction defocus amount DF, and FIG. 17 is a flow chart for explaining an operation of the sequence controller. Table 1 shows a relationship between an AF bracket mode and a flag.

A user can execute continuous photographing in the AF bracket mode by operating the AF bracketing button 56a shown in FIG. 15.

TABLE 1

| Correction Defocus Amount | | | | Number of Photographing Times | |
|---|---|---|---|---|---|
| DF | Flag A | DF | Flag A1 | N | Flag B |
| 0 (no AFB) | 00 | 0 (no AFB) | 00 | 1 (no AFB) | 00 |
| δ/M1 μm | 01 | 50 μm | 01 | 3 | 01 |
|  |  | 100 μm | 10 | 5 | 10 |
|  |  | 150 μm | 11 | 7 | 11 |

In step S200 in FIG. 16, the CPU checks whether the AF bracketing button 56a is operated. If Y in step S200, the flow advances to step S201.

In step S201, "00" is set in the flag A in order to reset the correction defocus amount DF, thereby setting the correction defocus amount DF to be 0 μm as shown in Table 1.

In step S202, the lens information detector 62 reads out aperture value information.

In step S203, "01" is set in the flag A to set the correction defocus amount DF to be δ/M1 as shown in Table 1.

In step S204, "00" is set in the flag B in order to reset the number of photographing times N, thereby setting the number of photographing times N to be "1" as shown in Table 1.

In step S205, the set correction defocus amount DF and number of photographing times N are displayed in the display window 631.

If the up button 56b is operated in step S206, the flow advances to step S212. In step S212, the flag B is updated in such a direction (00→11) as to increase the number of photographing times N, and the number of photographing times corresponding to the flag B is displayed on the display 632. If the up button 56b is not operated in step S206, the flow advances to step S207.

If the down button 56c is operated in step S207, the flow advances to step S213. In step S213, the flag B is updated in such a direction (11→00) as to decrease the number of photographing times N, and the number of photographing times N corresponding to the flag B is displayed on the display 632. If the down button 56c is not operated, the flow advances to step S208.

If the AF bracketing button 56a is depressed again in step S208, the correction defocus amount DF and the number of photographing times N set in steps S200 to S207 are fixed.

If "00" is set in the flag B in step S209, the continuous photographing mode is not set. Therefore, in order to reset the continuous photographing mode, the flow returns to step S205. If "00" is not set in the flag B, the continuous photographing mode is set. Therefore, the flow advances to step S210.

In step S210, the correction defocus amount DF and the number of photographing times N set in steps S200 to S207 are written in the register 58.

In step S211, an AF bracketing display state returns to a normal display state (a display of exposure information or the number of photographs).

In this manner, the correction defocus amount DF and the number of photographing times N are stored in the register 58, and the sequence controller 59 operates on the basis of the stored information. An operation of the sequence controller 59 will be described below with reference to FIG. 17 assuming that the number of photographing times N=3 and the correction defocus amount DF=δ/3.

If a user operates a release button in step S251 in FIG. 17, the flow advances to step S252.

In step S252, the correction defocus amount DF and the number of photographing times N are set in the sequence controller 59.

In step S253, the AFB mode is started, and a first AF bracketing operation is started.

In step S254, the lens 55 is driven to a focus position and focused on the basis of a defocus amount detected by the focus detect circuit 51 and the calculator 52.

In step S255, the camera mechanism 61 is activated to perform a first film exposure operation.

In step S256, the camera mechanism 61 is activated again to perform a film wind-up operation.

In step S257, the correction defocus amount DF=δ/3 is added to the defocus amount detected by the focus detect circuit 51 and the calculator 52, and the lens 55 is driven to a near-focus position.

In steps S258 and S259, the camera mechanism 61 is activated to perform second film exposure and film wind-up operations.

In step S260, the correction defocus amount DF=δ/3 is subtracted from the defocus amount detected by the focus detect circuit 51 and the calculator 52, and the lens 55 is driven to a far-focus position.

In steps S261 and S262, the camera mechanism 61 is activated to perform third film exposure and film wind-up operations.

In steps S263 and S264, a normal photographing mode is reset, and the process is ended.

The above AF bracketing operation is automatically repeated in accordance with the correction defocus amount DF and the number of photographing times N.

In the third embodiment, therefore, the correction defocus amount DF=δ/M1 is added to/subtracted from the defocus amount for driving the lens 55 to the focus position, thereby performing photographing a plurality of times. Since the correction defocus amount DF is set on the basis of the depth of focus δ, the lens 55 is not greatly offset from its focus position, and photographing is performed a plurality of times near the focus position. Therefore, when an object to be photographed having a large depth or a person is photographed, a user can select a most preferable photograph after photographing.

In order to set an object to be photographed slightly out of focus on purpose, the correction defocus amount DF can be obtained without processing the depth of focus δ or can be set to be an integer multiple of the depth of focus δ.

In order to set the correction defocus amount DF in consideration of a depth of field corresponding to a depth of focus, the fact that the depth of field depends on information about a focal length of a lens, a distance to an object to be photographed, an aperture value, and an image magnification need only be considered.

Figure 18:
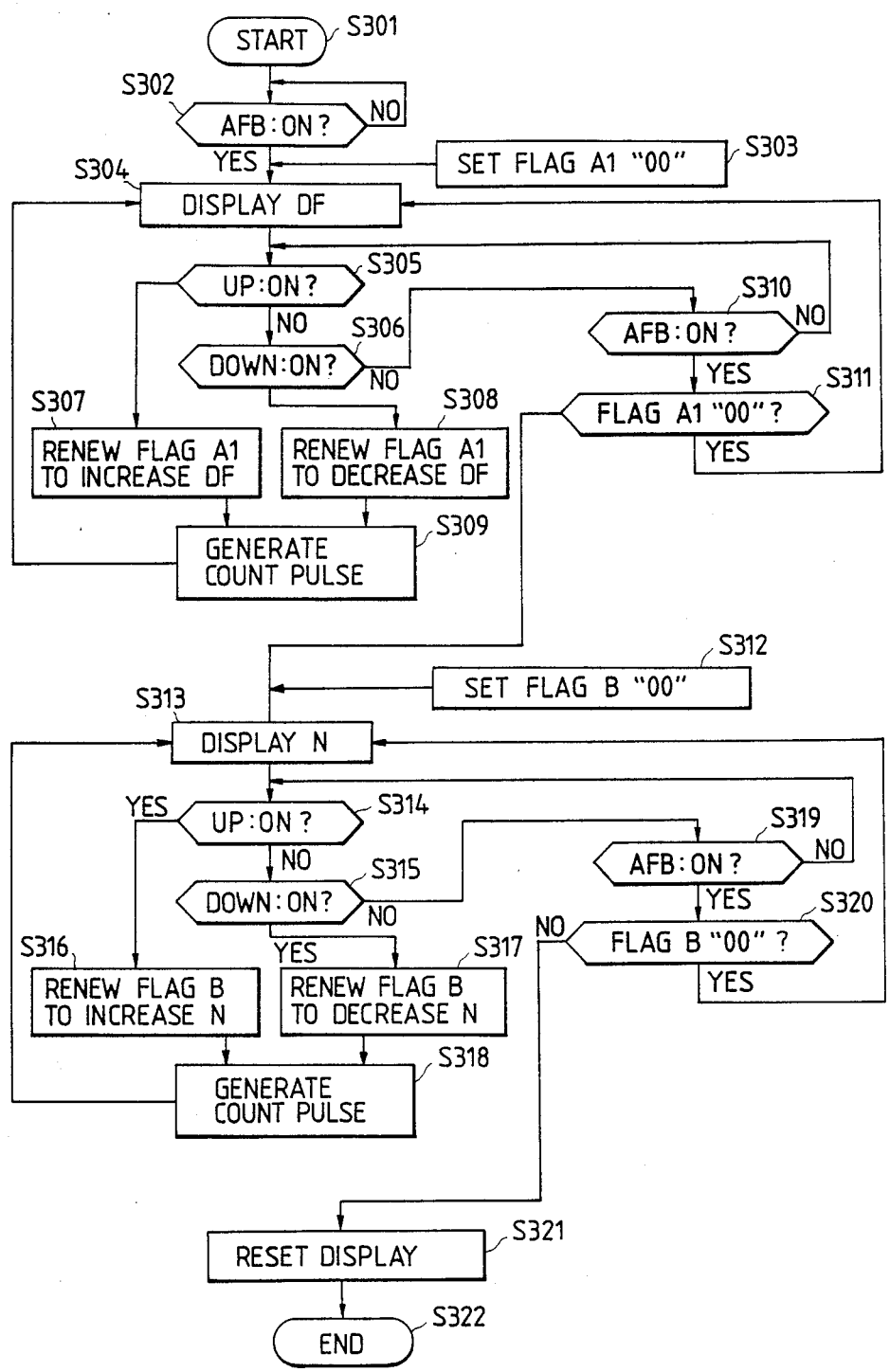
FIG. 18 is a flow chart for explaining a setting operation for setting the number of photographing operations and a correction defocus amount according to a fourth embodiment of the present invention and different from that shown in FIG. 16.

FIG. 18 is a flow chart for explaining an operation of setting the number of photographing times and a correction defocus amount according to a fourth embodiment of the present invention. The fourth embodiment is arranged so that a user can arbitrarily set a desired correction defocus amount. Since an arrangement of the fourth embodiment is basically the same as that of the third embodiment, only a different process will be described below with reference to FIGS. 14 and 15 and Table 1.

If a user operates an AF bracketing button 56a in steps S301 and S302 in FIG. 18, the flow advances to steps S303 and S304.

In step S303, "00" is set in a flag A1 and a correction defocus amount DF is set to be "0" as shown in Table 1. In step S304, a display 633 in a display window is operated.

If an up button 56b is operated in step S305, the flow advances to step S307. In step S307, the flag A1 is updated in such a direction (00→11) as to increase the correction defocus amount DF as shown in Table 1. If the up button 56b is not operated in step S305, the flow advances to step S306. If a down button 56c is operated in step S306, the flag A1 is updated in such a direction (11→00) as to decrease the correction defocus amount DF in step S308, thereby setting a correction defocus amount desired by the user.

When the correction defocus amount DF is set in step S307 or S308, a count pulse is generated in step S309, and the flow returns to step S304 to update the value of the display 633.

If neither of the up and down buttons 56b and 56c are operated in steps S305 and S306, the flow advances to step S310. If the AF bracketing button 56a is not operated in step S310, the flow returns to step S305. If the AF bracketing button 56a is operated in step S310 and the flag A1 is "00" in step S311, the flow returns to step S304. If the flag A1 is not "00", i.e., the correction defocus data DF is set, the set correction defocus amount DF is stored in a register 58, and the flow advances to an operation of setting the number of photographing times N.

If the flag A1 is not "00" in step S311, "00" is set in a flag B representing the number of photographing times in step S312, thereby resetting the number of photographing times N to be "0".

In step S313, the display 632 is activated.

If the up button 56b is operated in step S314, the flow advances to step S316. In step S316, the flag B is updated in such a direction (00→11) as to increase the number of photographing times N. If the up button 56b is not operated in step S314, the flow advances to step S315. If the down button 56c is operated in step S315, the flow advances to step S317. In step S317, the flag B is updated in such a direction (11→00) as to decrease the number of photographing times N, thereby setting the number of photographing times N desired by the user.

If the flag B is updated in step S316 or S317, a count pulse is generated in step S318, and the value of display 632 is updated by the generated pulse in step S313.

If neither of the up and down buttons 56b and 56c are operated in step S314 and S315, the flow advances to step S319. If the AF bracketing button 56a is not operated in step S319, the flow returns to step S314. If the bracketing button 56a is operated in step S319, the flow advances to step S320. If the flag B is not "00", i.e., the number of photographing times is set in step S320, the set number of photographing times is stored in the register 58, and a normal display state is reset in step S321. If the flag B is "00" in step S320, the flow returns to step S313.

When the correction defocus amount DF and the number of photographing times N are set as described above, a sequence controller 59 operates to perform AF bracketing photographing as in the third embodiment.

In the above third and fourth embodiments, AF bracketing photographing is performed when the automatic focus detect circuit operates. However, the present invention is not limited to the above embodiments but can be arbitrarily changed. For example, if a lens barrel has a power focusing function, AF bracketing can be automatically performed by power focusing on the basis of the correction defocus amount DF and the number of photographing times N set by operating the AF bracketing button 56a. As a result, the same result as in the above embodiments can be obtained.

In the third and fourth embodiments, if the number of photographing times is set to be three, for example, a focus position of a lens, its near-focus position, and its far-focus position are determined on the basis of a depth of focus of the lens or a desired correction amount, and the lens is sequentially driven to the three positions to perform first to third photographing operations. Therefore, three photographs can be taken with slightly different distances to an object to be photographed, and a user can select a most preferable photograph after photographing.

As described above, according to the third and fourth embodiments of the present invention, photographing is performed at not only a focus position detected by the focus detect circuit of a camera but also a plurality of positions near the focus position. Therefore, even when a main object to be photographed is much smaller than a picture or has a large depth, a user can select a most desired photograph in focus with the main object to be photographed after photographing.

What is claimed is:

1. An automatic focusing apparatus of a camera having a photographic lens moved in response to a release operation in order to perform focusing, comprising:
   detecting means for forming pieces of information concerning focus conditions of said photographic lens with respect to at least three areas in a field;
   means for driving said photographic lens in order to perform focusing;
   means for outputting an instruction for changing a position of said photographic lens; and
   control means for controlling, on the basis of the information from said detecting means, said lens driving means such that said photographic lens is focused on one of the areas in response to the release operation and the instruction and then sequentially focused on the remaining areas in accordance with a predetermined sequence.

2. An apparatus according to claim 1, wherein said control means controls said lens driving means such that said photographic lens is first focused on one of a plurality of areas in which a closest or farthest object to be photographed is present.

3. An apparatus according to claim 1, further comprising mode setting means capable of selectively setting a first mode in which said photographic lens in an in-focus state is stopped regardless of a change in field and a second mode in which said photographic lens in an in-focus state is continuously driven in order to maintain the in-focus state in accordance with a change in field,
wherein said instruction output means includes an operating member to be operated to designate the position change when the first mode is selected.

4. An apparatus according to claim 3, wherein said control means stops said photographic lens at a current position when said operating member is operated in the second mode.

5. An automatic focusing apparatus of a camera having a photographic lens moved in response to a release operation in order to perform focusing, comprising:
detecting means for forming pieces of information concerning focus conditions of said photographic lens with respect to at least three areas in a field;
means for driving said photographic lens in order to perform focusing; and
means for controlling, on the basis of the information from said detecting means, said lens driving means such that said photographic lens is focused on one of the areas in response to the release operation and then sequentially focused on the remaining areas in accordance with a predetermined sequence.

6. An apparatus according to claim 5, wherein said control means includes means for storing the pieces of information and means for sequentially reading out the stored pieces of information, and controls said lens driving means on the basis of the pieces of information in an order the pieces of information are read out.

7. An automatic focusing apparatus of a camera having a photographic lens movable in response to a release operation in order to perform focusing, comprising:
detecting means for forming pieces of information concerning focus conditions of said photographic lens with respect to a plurality of areas in a field;
means for driving said photographic lens in order to perform focusing;
means for controlling, on the basis of the information from said detecting means, said lens driving means such that said photographic lens is sequentially focused on the areas in a predetermined sequence in response to the release operation; and
exposure control means for executing, in response to said control means, photographing of an object to be photographed each time said photographic lens is focused.

8. An apparatus according to claim 7, wherein said control means controls said lens driving- means such that focusing is performed only once for areas having pieces of information of those supplied from said detecting means and included in an allowable predetermined approximate range and is performed once for each of areas having pieces of information not included in the predetermined approximate range.

9. An apparatus according to claim 7, wherein said control means controls said lens driving means such that focusing is performed only once for areas having pieces of information of those supplied from said detecting means and included in a depth of field range corresponding to a depth of focus of said photographic lens and is performed once for each of areas having pieces of information not included in the depth of field range.

10. An automatic focusing apparatus of a camera, comprising:
a photographic lens;
detecting means for outputting information concerning a focus condition of said photographic lens;
means for driving said photographic lens on the basis of the information from said detecting means in order to perform focusing;
mode-setting means capable of selectively setting a continuous photographing mode in which said photographic lens is sequentially displaced to a plurality of focus positions of said photographic lens with respect to a single object to be photographed by a predetermined amount based on a depth of focus of said photographic lens on the basis of the information from said detecting means, thereby performing photographing, and a single photographing mode for performing photographing once; and
control means for controlling said lens driving means in accordance with the photographing mode set by said mode setting means.

11. An apparatus according to claim 10, further comprising:
means for outputting information concerning at least an aperture value of said photographic lens; and
means for determining a depth of focus of said photographic lens on the basis of the aperture value information,
wherein when the continuous photographing mode is set, said control means corrects the information concerning a focus condition for each photographing on the basis of the determined depth of focus and controls said lens driving means.

12. An automatic focusing apparatus of a camera, comprising:
means for outputting information concerning a distance to an object to be photographed;
means for driving a photographic lens on the basis of the information in order to perform focusing;
mode setting means for setting a continuous photographing mode for continuously performing photographing a plurality of times;
means for arbitrarily setting a predetermined correction amount to be added to the information in the continuous photographing mode set by said mode setting means; and
means for changing the set predetermined correction amount for each photographing and controlling said lens driving means in accordance with information corrected by the changed correction amount in the continuous photographing mode set by said mode setting means.

* * * * *